(12) United States Patent
Miles et al.

(10) Patent No.: US 7,095,684 B1
(45) Date of Patent: Aug. 22, 2006

(54) SYSTEM FOR ACTIVELY CONTROLLING THE LENSE OF AN OPTICAL PICKUP WHEN NOT IN OPERATION

(75) Inventors: Dean Anthony Miles, Kent (GB); Nick James Robberts, Maldon Essex (GB); Kevin Langley Gallichan, London (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 504 days.

(21) Appl. No.: 10/030,596

(22) PCT Filed: Jul. 5, 2000

(86) PCT No.: PCT/GB00/02595

§ 371 (c)(1),
(2), (4) Date: Jun. 13, 2002

(87) PCT Pub. No.: WO01/04884

PCT Pub. Date: Jan. 18, 2001

(30) Foreign Application Priority Data

Jul. 8, 1999 (GB) .................................. 9915867.7

(51) Int. Cl.
*G11B 7/08* (2006.01)
(52) U.S. Cl. .................................. 369/44.27
(58) Field of Classification Search ............. 369/44.27; 250/201.5
See application file for complete search history.

(56) References Cited

U.S. PATENT DOCUMENTS

| | | | | |
|---|---|---|---|---|
| 4,652,806 A | * | 3/1987 | Aiello | 318/696 |
| 4,766,586 A | * | 8/1988 | Einhaus | 369/217 |
| 4,841,214 A | * | 6/1989 | Ueda et al. | 318/696 |
| 4,885,733 A | * | 12/1989 | Tsuboi | 369/44.32 |
| 5,010,534 A | * | 4/1991 | Enari et al. | 369/30.16 |
| 5,020,045 A | | 5/1991 | Smart et al. | |
| 5,243,591 A | * | 9/1993 | Mogamiya | 360/255.1 |
| 5,590,006 A | | 12/1996 | Shafe et al. | |
| 5,796,697 A | * | 8/1998 | Masaki et al. | 720/659 |
| 6,262,554 B1 | * | 7/2001 | Kojima et al. | 318/685 |
| 6,341,051 B1 | * | 1/2002 | Hachiya et al. | 360/265.1 |

FOREIGN PATENT DOCUMENTS

| | | |
|---|---|---|
| EP | 0 550 097 A2 | 12/1992 |
| EP | 0 558 293 B1 | 2/1993 |
| JP | 5-182273 | 7/1993 |
| JP | 7-129983 | 5/1995 |
| JP | 11-66574 | 3/1999 |

* cited by examiner

*Primary Examiner*—William Korzuch
*Assistant Examiner*—Michael V. Battaglia
(74) *Attorney, Agent, or Firm*—Brinks, Hofer, Gilson & Lione

(57) ABSTRACT

The present invention relates to an optical media system (40) for suppressing externally induced rattle of an optical media pickup. The system (40) comprises: an optical pickup (41) for reading from and/or writing to an optical storage medium (43), the optical pickup (41) having one or more sources of light (61), an objective lens (2), a focus and/or tracking actuator (1) for moving the lens (2) to focus and/or track the light on the optical medium (43) and mechanical limits to limit the focus and/or tracking movement of the lens (2); and an actuator controller (58) for controlling the actuator (1) and hence the focus and/or tracking position of the lens (2), characterised in that the actuator controller (58) actively controls the lens position when the optical pickup (41) is not being used with the optical medium (43).

11 Claims, 2 Drawing Sheets

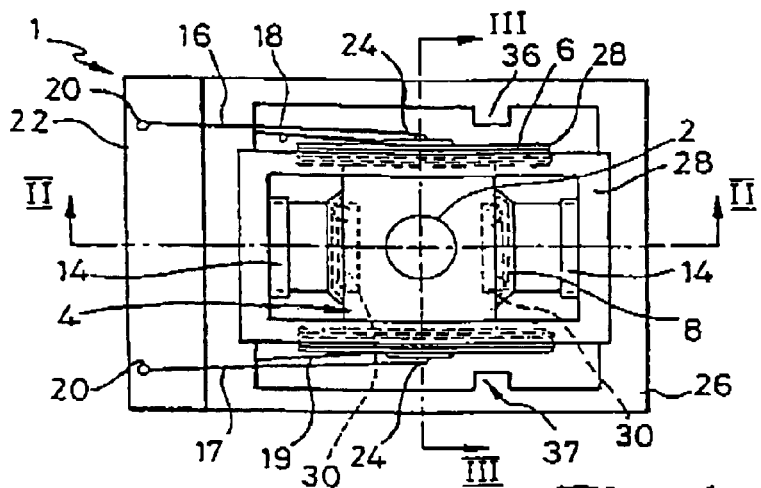

SYSTEM FOR ACTIVELY CONTROLLING THE LENSE OF AN OPTICAL PICKUP WHEN NOT IN OPERATION

The present invention relates to an optical media system for suppressing externally induced rattle of an optical media pickup.

Optical media, such as optical discs, card or tape, are usually read and/or written to by an optical pickup containing an objective lens mounted in a voice coil actuator which performs focus and optionally tracking on the optical media. The objective lens is normally mounted in a carriage on a suspension, for example at the ends of flexible or hinged arms, with a biasing means that biases the lens to a neutral position often at the centre of a focussing range of about ±1 mm. The focus motor is usually a voice coil actuator which moves between limits such as end stops that protect the focus actuator or lens from potential mechanical damage.

During normal operation in focussing on optical media, the end stops should never be reached, as a focus servo will keep the pickup focussed on the optical media. When the optical pickup is not being used, it may be moved off to one side of the optical media, so that the lens is no longer in position to read/write to/from the media.

The inventors have noted a problem with Compact Disc (CD) optical pickups in motor vehicles. Engine, road and wind noise reduction and rattle elimination is always desirable to provide for a quieter ride. In a very quiet car, rattles were noted in a CD player when the car was driven on a bumpy surface. The source of the noise was traced to the CD pickup hitting the focus end stops when the pickup was in a parked position, owing to vertical vehicle movement and vibrations.

It is an object of the present invention to provide an optical media pickup with improved rattle characteristics.

Accordingly, the invention provides an optical media system comprising: an optical pickup for reading from and/or writing to an optical storage medium, the optical pickup having one or more sources of light, an objective lens, a focus and/or tracking actuator for moving the lens to focus and/or track the light on the optical medium and mechanical limits to limit the focus and/or tracking movement of the lens; and an actuator controller for controlling the actuator and hence the focus and/or tracking position of the lens, characterised in that the actuator controller actively controls the lens position when the optical pickup is not being used with the optical medium.

Because the focus lens position is controlled, rattling of the actuator is suppressed or eliminated.

The mechanical limits may be defined by the construction of the optical pickup, for example being provided by end stops about the lens and separated by a spacing along an axial focus direction of the lens, or along a tracking direction transverse to the axial position.

The light may be any suitable visible or invisible light source, for example, near infra-red laser light or LED light.

The term optical media systems includes optical disc, tape and card systems. These include read-only systems such as those using compact disc media and read/write/erase systems such as those using magneto-optic data disc media.

The optical pickup will in general include focus detection means which generates a focus error signal when the pickup is used to read from or write to the optical medium. The optical disc system will then contain focus servo electronics so that the focus actuator can be moved to keep the objective lens positioned correctly for focus on the optical medium.

In a preferred embodiment of the invention, the optical pickup is moved to a park position away from the optical medium when not being used with such an optical medium. Then, the system can include a focus object at the park position so that the actuator controller can focus the light on the focus object when the optical pickup is not being used with the optical medium in order to hold the lens focus position within the mechanical limits.

The focus object may advantageously be made to have similar optical characteristics to those of the optical medium. For example, if the optical medium has a transparent substrate through which the light is focussed to an information-bearing layer, then the lens will normally be adapted to focus light through this substrate in order to read and/or write to the optical medium. This is because focussing light through a planar substrate will introduce spherical aberration, which would result in an increase in focus spot size. The light from the focus lens is therefore pre-aberrated with an opposite spherical aberration so that this aberration is cancelled after the light has traversed the correct thickness of substrate.

The focus object may then include a substrate similar to that of the optical medium. This gives the advantage of reducing any adverse affects on focus due to dust or dirt on the focus object.

Because in practice the focus object cannot be perfectly reflective, the light on the focus object will generate heat where this is focussed. Therefore, the focus actuator may control the lens position when the optical pickup is not being used with the optical medium so that the focus of light on the focus object is defocused in order to reduce the illuminance on the focus object. In this way, the heat generated by the focussed light may be reduced.

Such an optical defocus may be obtained by injecting a focus offset signal into the electronic focus servo loop to the focus actuator.

Alternatively or additionally, the light may be pulsed on the focus object in order to reduce the average illuminance. When the focus servo uses light returned from the focus object to generate a focus error signal for a feedback servo to the focus actuator, the pulsing of light should be set so that a sufficiently strong focus error signal may still be generated. Because the focus object is fixed, unlike the optical medium, the average light intensity on the focus object may made less than that on the optical medium.

The focus object may contain thermally conductive material for dissipating heat absorbed from the focus light. For example, the focus object may include a reflective layer on which the focus actuator focuses, the thermally conductive material being a thickness of the reflective layer significantly beyond that needed for bulk reflectivity.

For example, in the case of an aluminium reflector layer, about 40 nm to 50 nm thickness is needed in order to achieve a bulk reflectivity of about 95% at 830 nm. If the thickness is increased to about 250 nm, then the aluminium layer will be able to conduct about five times as much heat from the focus area. The focus or tracking actuator may be a voice coil actuator, the actuator controller being connected to the voice coil actuator and including circuitry that detects a voltage or a current generated by externally induced movement of the voice coil when the optical pickup is not being used with the optical medium in order to generate a compensating voltage or current in order to control the lens position.

The optical pickup may have at least one end stop that defines a limit to the focus and/or tracking movement of the lens. The actuator controller can then bias the lens towards an end stop when the optical pickup is not being used with the optical medium so that the lens position is held at the end stop.

Alternatively, when the optical pickup has a pair of end stops that define a limit to the focus (or tracking) movement of the lens, the actuator controller may control the lens position to a median position between the end stops.

The optical media system may be used in a vehicle, such as a motor car, comprising a motive means by which the vehicle may be energised to move. The vehicle will in general have an electrical power source to power the optical media system. The actuator controller then actively controls the focus position of the lens when, and preferably only when, the vehicle is energised to move.

The invention will now be further described, by way of example, with reference to the accompanying drawings, in which:

FIG. 1 is a schematic view of a focus and tracking actuator of an optical pickup as seen from inside the pickup along the optical axis of an objective lens;

FIG. 2 is a cross-section through the actuator of FIG. 1, taken along line II—II;

FIG. 3 is a cross-section through the actuator of FIG. 1, taken along line III—III;

FIG. 4 is a schematic drawing of an optical media system according to a first embodiment of the invention, showing an optical pickup with the actuator of FIG. 1, with associated control electronics and an optical disc;

Figure 7:
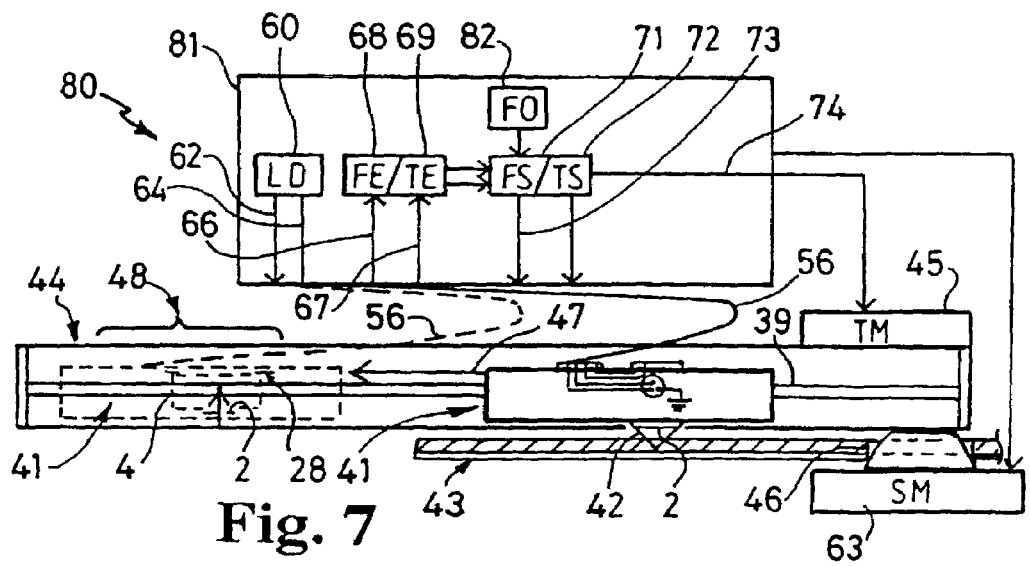
FIG. 7 is a schematic drawing of an optical media system according to a second embodiment of the invention.

FIGS. 1, 2 and 3 show a focus and tracking voice coil actuator 1 of conventional design for an optical pickup. The actuator has an objective lens 2 with a numerical aperture of 0.6 held in a surrounding cradle 4. The cradle 4 supports pairs of coils 6,8. One pair of coils 6 has a common axis 10 transverse to an optical axis 12 of the lens, and serves as a tracking actuator. The other pair of coils 8 has a common axis coincident with the optical axis 12 and serves as a focus actuator.

When electrical current is passed through a pair of coils 6,8, this generates a magnetic field which then interacts with a permanent magnetic field produced by a pair of permanent magnets 14 on opposite sides of the optical axis 12, in order to drive the cradle and objective lens along either the tracking axis 10 or the focus axis 12.

The cradle is supported by four straight suspension wires 16,17,18,19, which are arranged in pairs 16,17 and 18,19. As shown in FIG. 2, one pair 16,17 is generally above the coils 6,8 and the other pair 18,19 is generally below the coils 6,8. The wires all terminate at one end away from the cradle at corresponding electrical terminals 20 on a terminal block 22, and at the other end to corresponding terminals 24 to which ends of the coils 6,8 are wired. Therefore, current to drive the focus and tracking actuator 1 is supplied to the coils through the suspension wires 16–19.

Tension in the wires 16–19 when these are moved away from a neutral position creates biasing forces, which will tend to return the cradle 4 to a neutral position.

The terminal block supports a frame 26 that extends fully around the cradle 4 in a plane transverse to the optical axis 12 of the lens 2.

The frame 26 in turn supports a pair of end stops 28,30 shown most clearly in FIG. 2, one of which 28 extends frame-like about the optical axis 12 above the cradle, and the other of which 30 consists of a pair of ledges 31,32 that are inwardly directed towards the lens 2 in a plane generally below the cradle 4.

When the focus actuator is driven fully inwards, a top surface 34 of the cradle 4 contacts the upper stop 28, and when the focus actuator is driven fully outwards, a bottom surface 35 of the cradle 4 contacts the lower stop 30.

The frame 26 has a pair of inwardly directed projections 36,37, which act as stops in the tracking direction.

The focus and tracking stops 28,30,36,37 act to protect the focus and tracking actuator 1, and particularly the suspension wires 16–19, from mechanical damage which would occur at an extreme movement of the cradle 4 relative to the terminal block 22.

It has been discovered that in a motor car vibrations from the road cause a rattling between the cradle and focus end stops 28,30, but not between the cradle and tracking end stops. There are two reasons for this. One is that vibrations tend to be strongest in a vertical direction, which normally coincides with the optical axis 12, and the other is that the stiffness of the suspension wire to movement of the cradle in the tracking direction can be greater than in the focus direction. This difference in stiffness is due to the fact that the required frequency response of the tracking actuator is less than that required from the focus actuator.

FIG. 4 shows a first embodiment of the invention 40, in which the focus and tracking actuator 1 is incorporated in a conventional optical disc pickup 41. The pickup is shown focussing a beam of laser light 42 from the lens 2 onto a compact disc (CD) 43. The pickup 41 is mounted on rail 39 of a conventional linear tracking actuator 44 driven by a coarse tracking motor (TM) 45. The tracking motor 45 can move the optical pickup 41 so that the lens 2 can focus on an innermost portion 46 the CD 43. When the pickup is not being used to read from the CD, the tracking motor 45 can move 47 the optical pickup away from the CD 43 to a park position 48, as shown by the optical pickup 41 drawn in phantom.

A focus object 50 is provided at the park position 48 on which the lens 2 may focus. The focus object consists of a an aluminium reflector layer 51 encapsulated by a transparent substrate 52 of 1.1 mm thick polycarbonate, a lacquer backing layer 53, held in a surrounding moulded plastic cup 54.

When the lens 2 is focussed on the focus object 50, the position of the cradle 4 along the focus axis 12 is actively controlled so that the cradle is restrained from rattling against the focus end stops 28,30.

A person skilled in the art will be familiar with the conventional operation of an optical pickup, and so this will be described only briefly. The optical pickup 41 is connected by a ribbon cable 56 to control electronics 58. The control electronics 58 includes a laser diode driver (LD) 60 that supplies a current 62 to a laser diode 61 in the optical pickup, and receives from the laser diode 61 a power monitor signal 64. When the CD 43 is set spinning by a spindle motor 63 under the control of the control electronics 58, and the CD 43 is in view of the lens 2, a quadrant photodiode 65 sends a focus error signal 66 and a tracking error signal 67 to a corresponding focus error circuit 68 and tracking error circuit 69, which in turn are connected 70 to a focus servo circuit 71 and a tracking servo circuit 72. The focus servo circuit generates an appropriate focus correction signal 73, and the tracking servo circuit 72 generates both a coarse tracking correction signal 74 that is fed to the tracking motor 45, and a fine tracking correction signal 75. The focus and tracking correction signals 73,75 are then fed back to the focus and tracking coils 8,6 to keep the optical pickup 41 correctly focused and on track.

When the optical pickup 41 is in the park position 48, the control electronic can be used to keep the lens focussed on the focus object, and so avoid rattling of the optical pickup 41. This control can be activated whenever rattles might be expected. For example, if the optical media system 40 is part of a CD played in a motor car (not shown), then the active control of focus in the parking position may be activated as soon as the motor vehicle is energised by the driver.

In use with a CD, the laser power will be typically 1 mW. In order to reduce power consumption, and the heat absorbed by the focus object 50, the laser power at the focus position may be reduced to about 0.1 mW or less, either by pulsing the laser at a 10% duty cycle, or by reducing the laser power, or by a combination of these. Because the focus object is not moving relative to the optical pickup 41, this reduced power should not unduly affect focus operation.

Figure 5:
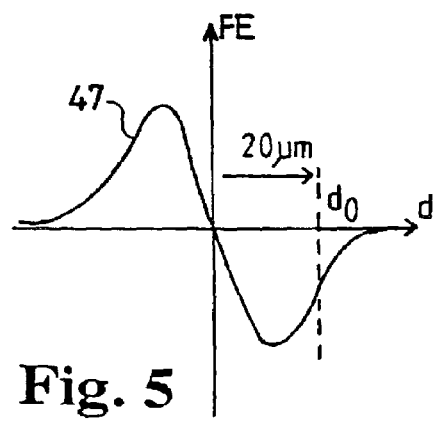
FIG. 5 is a plot of focus error signal against defocus distance.
Figure 6:
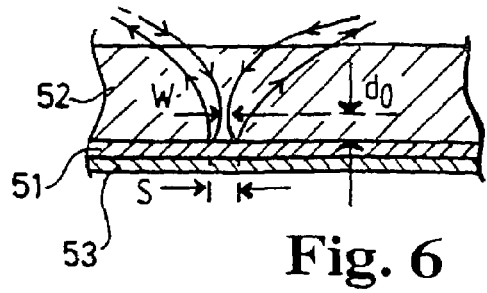
FIG. 6 is a schematic drawing showing how defocus and a relatively thick reflector layer can be used to reduce heat absorbed from a focus spot of the optical pickup.

FIGS. 5 and 6 show another way in which the heat absorbed by the focus object 50 may be reduced. FIG. 5 shows a plot of an S-shaped focus error signal 47 against defocus distance. The focus error signal 47 is zero outside ±40 μm of best focus. It is possible by introducing an offset into the derived focus error signal to lock onto focus at any point on the curve 47 with a sufficiently high slope, for example at a defocus distance do of 20 μm. As can be seen in FIG. 6, at this defocus distance, the focus spot size S will be about 10 μm, which implies an energy density about 100 fold less that at the best focus at the focus waist W of about 1 μm.

In addition, the reflector layer 51 is about 250 μm thick in order to increase the ability of the reflector layer 51 to conduct head away from the focus spot S.

FIG. 7 shows a second embodiment of an optical media system 80. This differs from the first embodiment 40 in that there is no focus object, and in that once the optical pickup 41 is in the park position 48, the focus coils 8 are energised to retract fully the lens 2 so that the cradle 4 is held securely against the upper stop 28. This is done with modified control electronics 81 in which a focus offset 82 is added to the focus servo 71. The cradle 4 can then be held against the upper end stop 28 with sufficient force so that expected vibration does not cause rattling of the cradle 4 against the end stops 28,30. An advantage of this embodiment is that there is no need to provide a focus object 50 which, although potentially quite inexpensive, does use a volume within the optical media system and add some small mechanical complexity.

Figure 8:
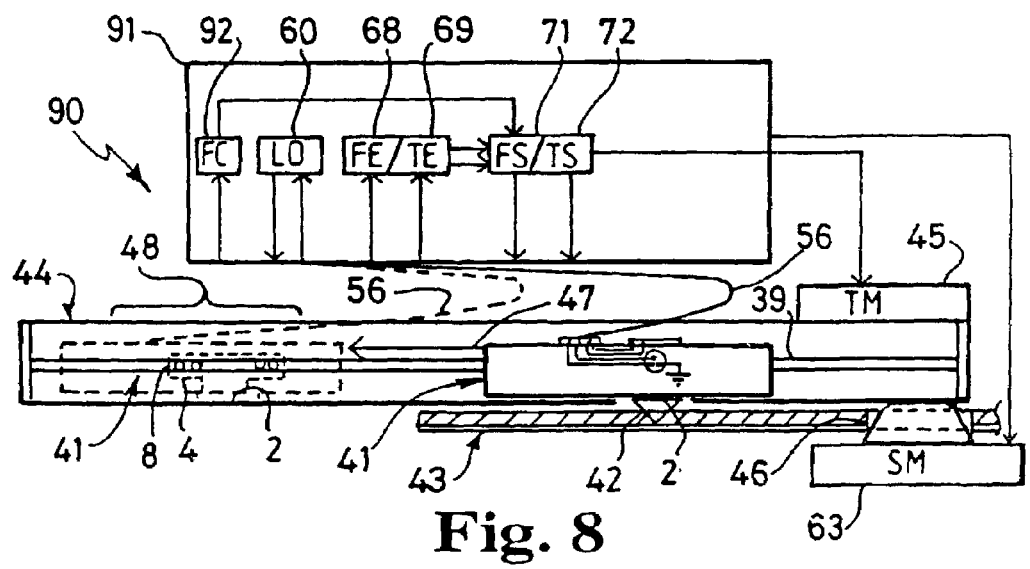
FIG. 8 is a schematic drawing of an optical media system according to a third embodiment of the invention.

FIG. 8 shows a third embodiment of an optical media system 90. This differs from the first embodiment 40 in that there is no focus object, and from the second embodiment 80 in that the position of the lens 2 and cradle 4 is not controlled so that the cradle is held against one of the end stops 28,30. There are two advantages to this approach. The first is that there is no need to provide a focus object 50 and the second is that the focus actuator is not biased fully in one direction, thereby avoiding any induced distortion over time to the wire suspension of the focus and tracking actuator.

In the park position 48 of FIG. 8, the position of the lens 2 is held away from the end stops 28,30 by the detection of currents induced in the focus coil 8 by movement of the focus coil in the static magnetic field of the permanent magnets 14. The currents are detected by modifying the control electronics 91 so that this includes a focus current detection circuit (FC) 92. An output 93 from the focus current detection circuit 92 is fed to the focus servo, which then generates with a current mirror an opposite current which is fed back into the focus coils 8 to cancel partially the induced movement of the lens 2 and cradle 4. Although it is not possible to cancel entirely the movement of the lens owing to inevitable lags between the detection of the induced current and the generation of a cancelling current, the movement can be controlled sufficiently to keep the cradle 4 from hitting the end stops owing to vibration in a moving motor car.

If tracking rattle is a problem, then the three embodiments described above may be modified so that instead of or in addition to the focus position being controlled, the tracking position is controlled. For example, in FIG. 4, the focus object 50 may have tracking grooves arranged essentially parallel with similar groves on the optical disc 43. The tracking servo 72 could then control the position of the lens 2 and cradle 4 to suppress or eliminate rattle in the tracking direction. In FIG. 7, the cradle 4 could be moved left or right so that this came up against one or the other of the tracking end stops 36,37. In FIG. 8, circuitry similar to that described for focus current detection and cancellation could be used to control tracking movement of the cradle 4 owing to vibration in the tracking direction.

The invention therefore provides a number of ways in which rattling of a focus and/or tracking actuator may be controlled in order to suppress or eliminate rattle induced by external vibrations of the optical media system. This is particularly useful in an automotive application, where in-vehicle rattles can be annoying to a driver or passengers.

The invention claimed is:

1. An optical media system comprising:
   an optical pickup for reading from and/or writing to an optical storage medium, the optical pickup having wall portions defining a cavity having an opening, one or more sources of light, and an objective lens disposed within the cavity, the optical pickup being movable between a park position when not in operation and an operating position when in operation;
   a focus and/or tracking actuator for moving the lens to focus and/or track the light on the optical medium and mechanical limits to limit the focus and/or tracking movement of the lens; and
   an actuator controller for controlling the actuator and hence the focus and/or tracking position of the lens, the actuator controller configured to induce a magnetic field interacting with the optical pickup to actively control the lens position within the cavity via the magnetic field when the optical pickup is in the park position; in which the optical pickup is moved to the park position away from the optical medium when not being used with such an optical medium.

2. The optical media system as claimed in claim 1, in which the actuator is a voice coil actuator, the actuator controller being connected to the voice coil actuator and including circuitry that detects a voltage or a current generated by externally induced movement of the voice coil when the optical pickup is not being used with the optical medium in order to generate a compensating voltage or current in order to control the lens position.

3. The optical media system as claimed in claim 1, in which the optical pickup has at least one end stop that defines a limit to the focus and/or tracking movement of the lens, and the actuator controller biases the lens towards an end stop when the optical pickup is not being used with the optical medium so that the lens position is held at the end stop.

4. The optical media system as claimed in claim 1, in which the optical pickup has a pair of end stops that define a limit to the focus and/or tracking movement of the lens, and the actuator controller controls the lens position to a median position between the end stops.

5. The optical media system as claimed in claim 1, wherein the optical media system is mounted in a vehicle and wherein the actuator controller actively controls the focus and/or tracking position of the lens when the vehicle is moving.

6. An optical media system comprising: an optical pickup for reading from and/or writing to an optical storage medium, the optical pickup having one or more sources of light, an objective lens, a focus and/or tracking actuator for moving the lens to focus and/or track the light on the optical medium and mechanical limits to limit the focus and/or tracking movement of the lens; an actuator controller for controlling the actuator and hence the focus and/or tracking position of the lens, characterized in that the actuator controller actively controls the lens position when the optical pickup is not being used with the optical medium; and a focus object at the park position so that the actuator controller focuses the light on the focus object when the optical pickup is not being used with the optical medium in order to hold the lens position within the mechanical limits.

7. The optical media system as claimed in claim 6, in which the lens is adapted to focus light through an optical substrate in order to read and/or write to the optical medium, and the focus object includes a similar substrate.

8. The optical media system as claimed in claim 6, in which the actuator controls the lens position when the optical pickup is not being used with the optical medium so that the focus of light on the focus object is defocused in order to reduce the illuminance on the focus object.

9. The optical media system as claimed in claim 6, in which the light is pulsed on the focus object.

10. The optical media system as claimed in claim 6, in which the focus object contains thermally conductive material for dissipating heat absorbed from the focus light.

11. The optical media system as claimed in claim 10, in which the focus object includes a reflective layer on which the focus actuator focuses, the thermally conductive material being a thickness of the reflective layer significantly beyond that needed for bulk reflectivity.

* * * * *